US011037236B1

(12) United States Patent
Ram et al.

(10) Patent No.: US 11,037,236 B1
(45) Date of Patent: Jun. 15, 2021

(54) ALGORITHM AND MODELS FOR CREDITWORTHINESS BASED ON USER ENTERED DATA WITHIN FINANCIAL MANAGEMENT APPLICATION

(71) Applicants: Siddharth Ram, Menlo Park, CA (US); Richard N. Preece, San Diego, CA (US); Joseph Timothy Callinan, Jr., Campbell, CA (US); Kathy Tsitovich, Mountain View, CA (US); Eva Diane Chang, Mountain View, CA (US); Madhu Shalini Iyer, Fremont, CA (US)

(72) Inventors: Siddharth Ram, Menlo Park, CA (US); Richard N. Preece, San Diego, CA (US); Joseph Timothy Callinan, Jr., Campbell, CA (US); Kathy Tsitovich, Mountain View, CA (US); Eva Diane Chang, Mountain View, CA (US); Madhu Shalini Iyer, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 210 days.

(21) Appl. No.: 14/170,460

(22) Filed: Jan. 31, 2014

(51) Int. Cl.
*G06Q 20/40* (2012.01)
*G06N 20/20* (2019.01)
*G06Q 40/02* (2012.01)

(52) U.S. Cl.
CPC ....... *G06Q 40/025* (2013.01); *G06Q 20/4016* (2013.01); *G06N 20/20* (2019.01)

(58) Field of Classification Search
CPC ............... G06Q 40/025; G06Q 10/063; G06Q 10/0637; G06Q 20/403; G06Q 10/06; G06Q 30/0201; G06F 11/3409; G06N 20/00; G06K 9/6282
See application file for complete search history.

(56) References Cited

U.S. PATENT DOCUMENTS

| | | | |
|---|---|---|---|
| 8,250,008 B1 * | 8/2012 | Cao | G06Q 30/02 706/14 |
| 8,386,377 B1 * | 2/2013 | Xiong et al. | 705/38 |
| 2005/0086246 A1 * | 4/2005 | Wood | G06F 17/30289 |
| 2007/0172844 A1 * | 7/2007 | Lancaster | C12Q 1/6886 435/6.12 |

(Continued)

OTHER PUBLICATIONS

The 2005 Enterprise Architecture, Process Modeling & Simulation Tools Report; Apr. 28, 2005; Curtis Hall et al. 184 pages.*

*Primary Examiner* — Christine M Behncke
*Assistant Examiner* — Mary M Gregg
(74) *Attorney, Agent, or Firm* — Ferguson Braswell Fraser Kubasta PC

(57) ABSTRACT

A method for modeling risk of a derogatory financial event. The method includes generating a risk profile of a small business (SMB) using a risk model based on accounting data and other third party business management application (BMA) data of the SMB. In particular, the risk model is generated using a training data set that includes accounting data and other third party BMA data of multiple SMBs over particular time periods related to historic derogatory events (e.g., to be delinquent and/or to default on a loan) of these SMBs. Generated using the risk model, the risk profile of the SMB represents the likelihood of a derogatory financial event occurring to the SMB.

14 Claims, 21 Drawing Sheets

(56) References Cited

U.S. PATENT DOCUMENTS

| | | | |
|---|---|---|---|
| 2009/0105167 A1* | 4/2009 | Potti | A61P 43/00 |
| | | | 514/34 |
| 2011/0270779 A1* | 11/2011 | Showalter | 705/36 R |
| 2012/0309030 A1* | 12/2012 | McKenna | G16B 40/00 |
| | | | 435/7.24 |
| 2013/0132269 A1* | 5/2013 | Abiola et al. | 705/38 |
| 2014/0136088 A1* | 5/2014 | Nikovski | G08G 1/01 |
| | | | 701/117 |
| 2014/0372363 A1* | 12/2014 | Chestnut | H04L 51/12 |
| | | | 706/52 |
| 2015/0134460 A1* | 5/2015 | Tian | G06Q 30/0269 |
| | | | 705/14.66 |
| 2015/0154508 A1* | 6/2015 | Chen | G06N 20/00 |
| | | | 706/12 |

* cited by examiner

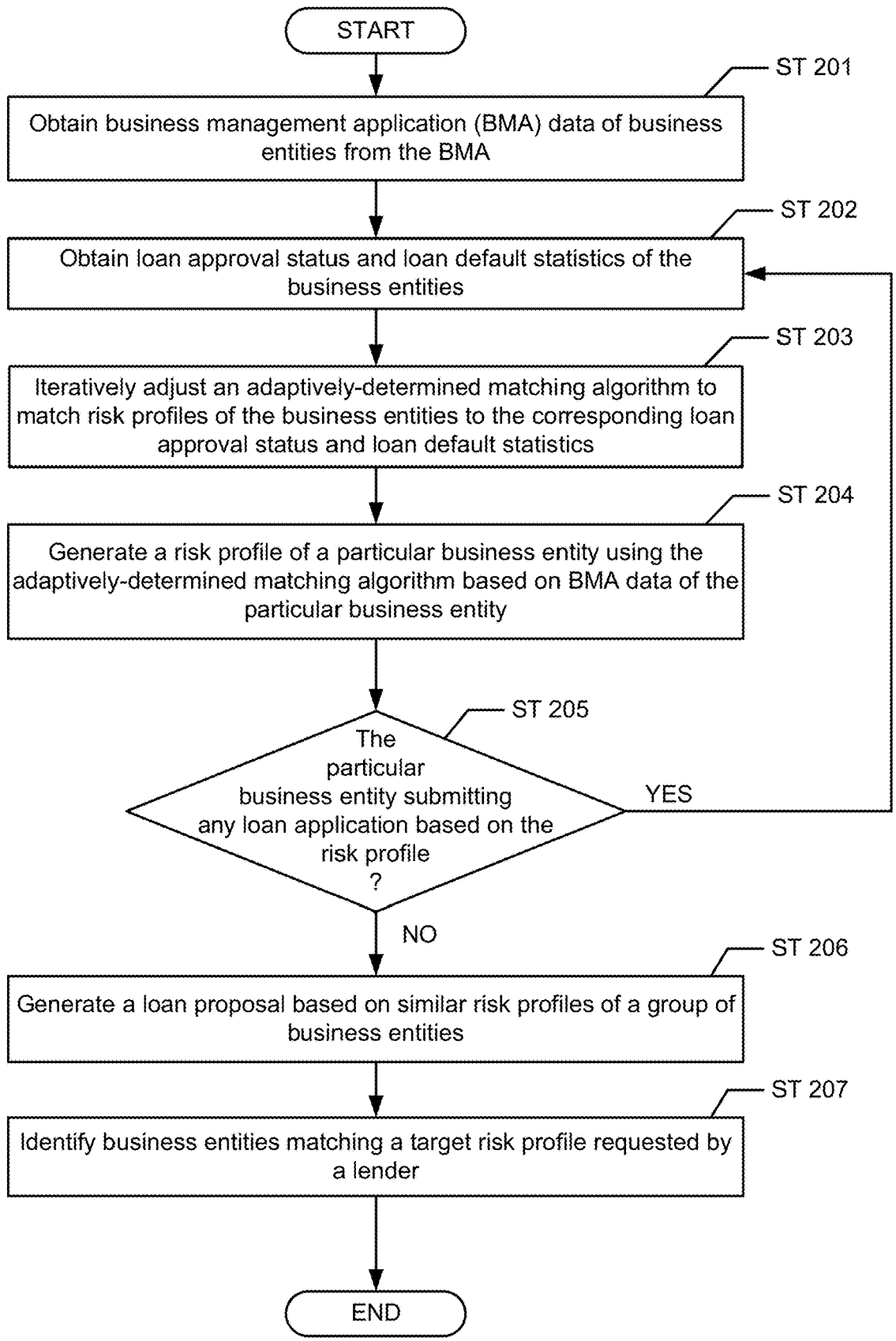
FIG. 2.1

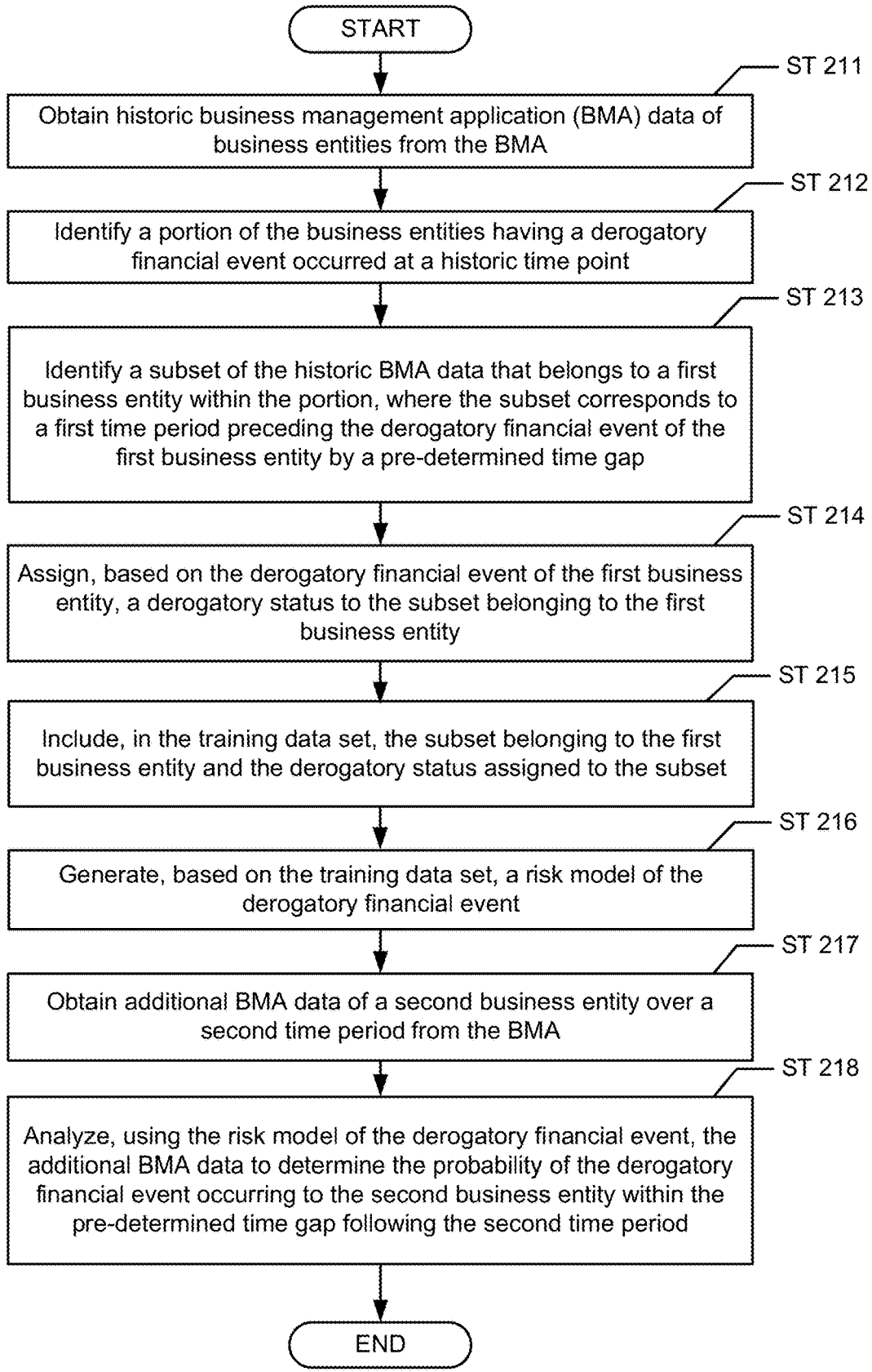
FIG. 2.2

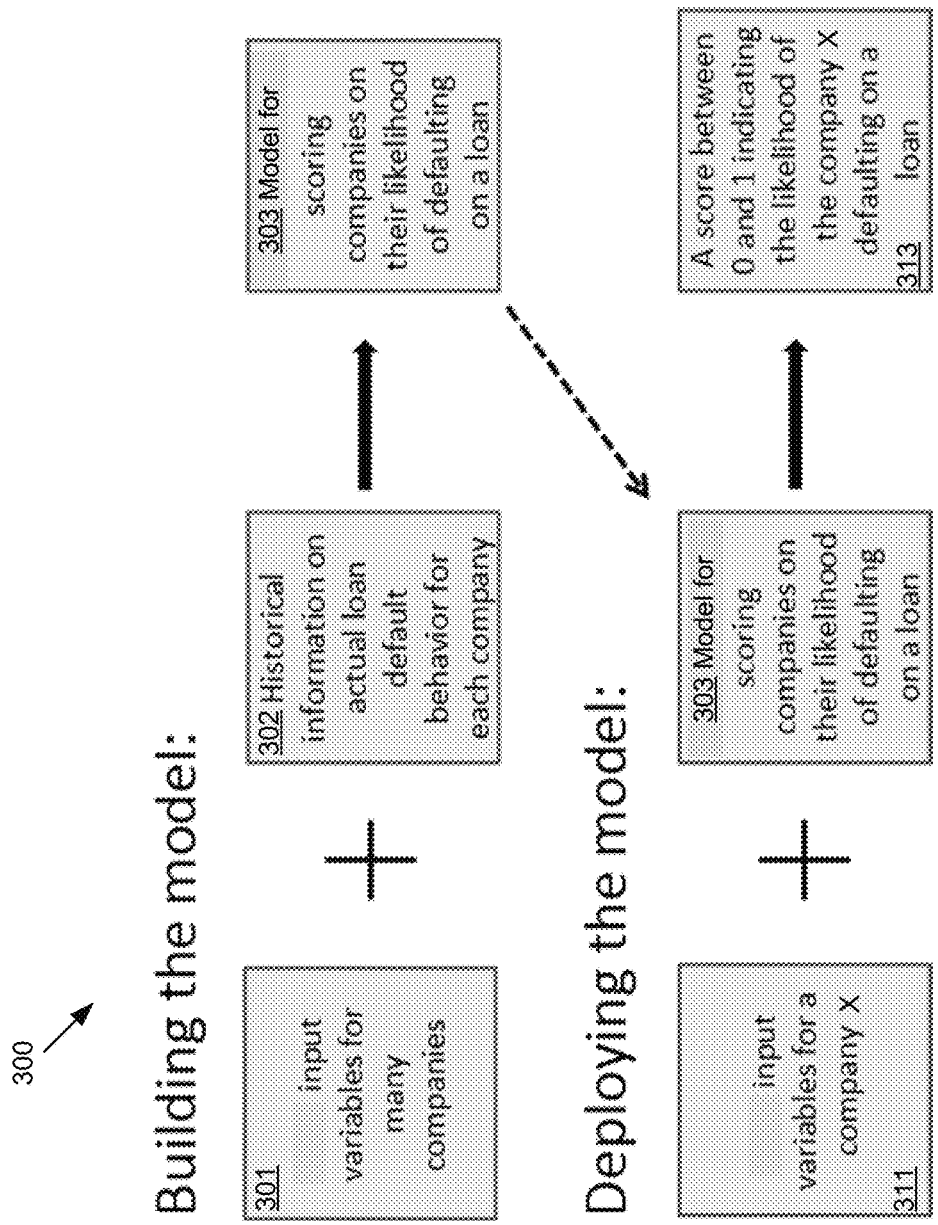
FIG. 3.1

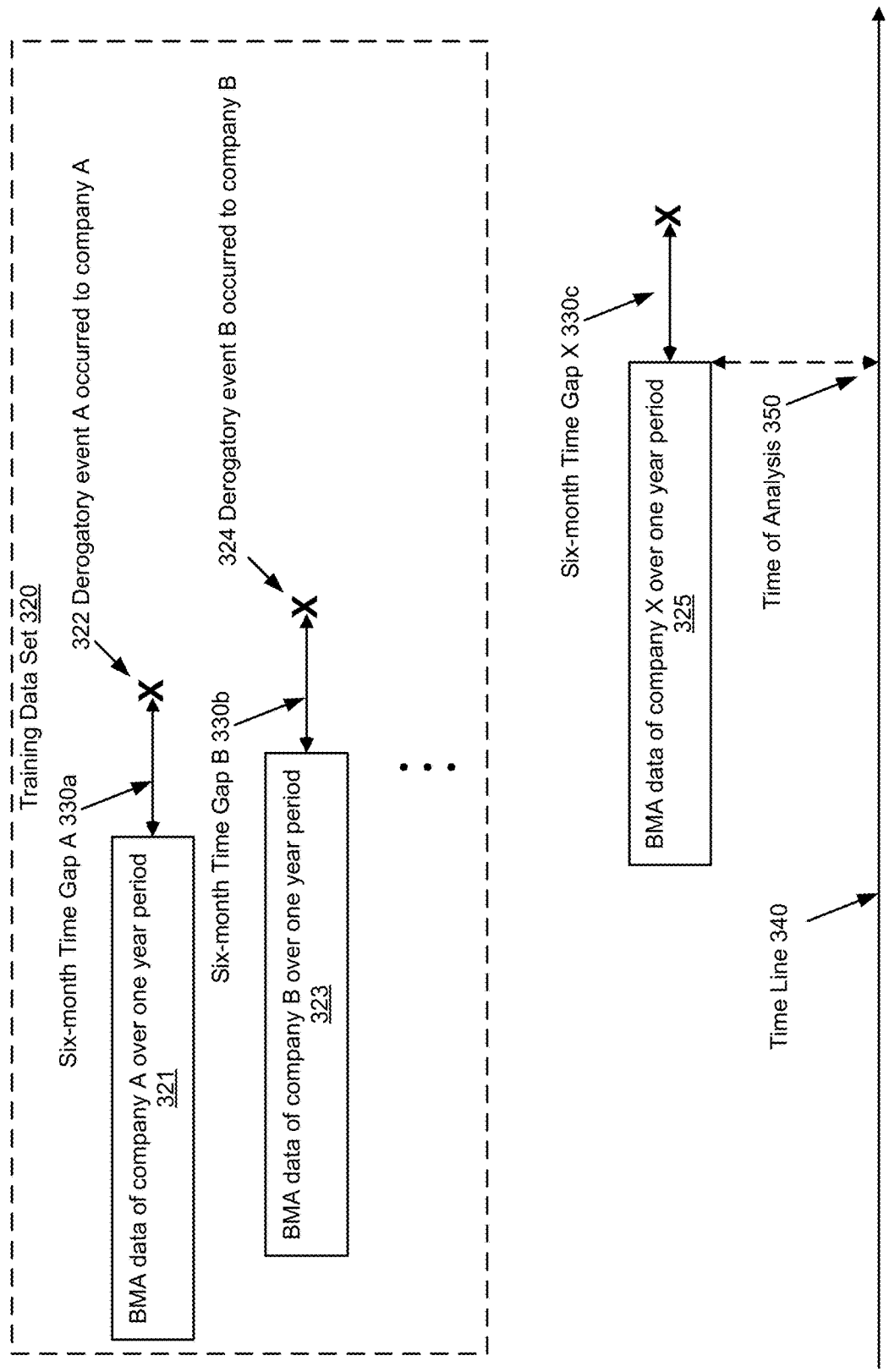
FIG. 3.2

| Business Management Application (BMA) Data | BMA Data Items (Variable Names used in BMA) | User-entered data | Usage/Behavioral data |
|---|---|---|---|
| Marketing Interaction -- details on which aspects of the marketing site were seen by the customer | Marketing channel | | x |
| | Source | | x |
| | Flag indicating if second page was seen | | x |
| | Flag indicating if start sign-up was seen | | x |
| | Flag indicating if demo was seen | | x |
| | Flag indicating if pricing was seen | | x |
| | Flag indicating if sample company was seen | | x |
| | Flag indicating if webinar page was seen | | x |
| | Flag indicating if services page was seen | | x |
| | Flag indicating if FAQs were seen | | x |
| | Flag indicating if marketing pages were visited before signup | | x |
| | Offer code | | x |
| | Product | | x |
| Business Management Application (BMA) Data | BMA Data Items (Variable Names used in BMA) | User-entered data | Usage/Behavioral data |
| General Setup Statistics -- tasks completed during setup and time taken to complete those tasks | Month when signed up | | x |
| | Start of year of sign up | | x |
| | Start of quarter of sign up | | x |
| | Sign up after CC | | x |
| | Minutes from first visit to signup | | x |
| | Minutes from sign up to doing something | | x |
| | Minutes from sign up to finished entering employees | | x |
| | Minutes Signup To Finished EEs divided by total number of employees | | x |
| | Hours from sign up to history created | | x |
| | HoursSignupToHistoryCreatedPerEE divided by total number of employees | | x |
| | Hours from sign up to first check | | x |
| | Hours from sign up to second check | | x |
| | Hours from doing something to history created | | x |
| | HoursDidSomethingToHistoryCreated divided by total number of employees | | x |
| | Hours from finished entering employees to history created | | x |

FIG. 5.1

| | | User-entered data | Usage/ Behavioral data |
|---|---|---|---|
| | HoursFinishedEEsToHistoryCreated divided by total number of employees | | x |
| | Hours from history created to first check | | x |
| | Hours from first check to second check | | x |
| | Flag indicating whether taxes were set up | | x |
| | Flag indicating whether employees were added | | x |
| | Flag indicating whether finished adding employees | | x |
| | Flag indicating whether company needs to import prior payroll history | | x |
| | Flag indicating status of import of prior payroll history | | x |
| | Flag indicating if set up was completed | | x |
| | Flag indicating if wrote first check | | x |
| Business Management Application (BMA) Data | BMA Data Items (Variable Names used in BMA) | User-entered data | Usage/ Behavioral data |
| Customer Support -- variables that summarize the customer's Customer Support interactions | Flag indicating if got a support ticket | | x |
| | Number of tickets | | x |
| | Total customer support time | | x |
| | Number of times email was used | | x |
| | Number of times letters were used | | x |
| | Number of times phone was used | | x |
| | Number of times site inquiries were made | | x |
| | Number of times text/chat was used | | x |
| | Number of times voicemail was used | | x |
| | Number of escalations | | x |
| | Number of questions about service | | x |
| | Number of bank verifications | | x |
| | Number of feature requests | | x |
| | Number of cancellations | | x |
| | Number of bugs reported | | x |
| | Number of account setup questions | | x |
| | Number of complaints | | x |
| | Number of compliments | | x |
| | Number of legal questions | | x |
| | Number of notifications | | x |
| | Number of problems with PDF | | x |
| | Number of suggestions | | x |
| | Average number words in details | | x |

FIG. 5.2

| Business Management Application (BMA) Data | BMA Data Items (Variable Names used in BMA) | User-entered data | Usage/Behavioral data |
|---|---|---|---|
| Accounting software acquisition details -- Details of how the accounting software was first acquired, as well as start up information | Identifier | | |
| | Name of the plan - Plus2010Monthly, PlusMonthly, SimpleStart2010Monthly, V7DefaultMonthlyPlan | | x |
| | Path for buying - import from desktop, trial page, buy page link | | x |
| | Date Trial started | | x |
| | Type of discount offered - No discount, twenty percent, ten percent Unlimited | | x |
| | How many days for discount to end | | x |
| | Number of users for billing purposes | | x |
| | role of the person who started using the product | | x |
| | Total number of users | | x |
| | Trial end date | | x |
| | When credit card details were entered | | x |
| | Number of online banking accounts that are connected | | x |
| | Next date CC will be charged | | x |
| | Flag indicating whether company has SEM tracking | | x |
| | Which browser was used to sign up: Other=0, IE=100, Firefox=200, Safari=300 | | x |
| | QBO Product SKU | | x |
| | First date when company was charged for QBO | | x |
| | Original SKU that customer signed up with, later could migrate to another | | x |
| | QBO account start date | | x |
| | Company record last modified date | | x |
| | Status - Subscriber, Trailer, Cancelled | | x |
| | Whether transactions have been imported from QBDT | | x |
| | Flag indicating whether QBDT auth_id exists | | x |
| | Flag indicating whether TEK login has been created | | x |
| | when the last alert email was processed | | x |
| Business Management Application (BMA) Data | BMA Data Items (Variable Names used in BMA) | User-entered data | Usage/Behavioral data |
| Business Statistics | The total number of employees, vendors, and customers entered-Available directly through IPP | x | |
| | The number of accounts entered-Available directly through IPP | x | |
| | The number of items entered-Available directly through | x | |

FIG. 5.3

| | IPP | | |
|---|---|---|---|
| | Number of employees on the books last month- Computable from IPP data | x | |
| Business Management Application (BMA) Data | BMA Data Items (Variable Names used in BMA) | User-entered data | Usage/ Behavioral data |
| Money in/out | Total amount in last month- Computable from IPP data | x | |
| | Total amount outbound last month- Computable from IPP data | x | |
| | # incoming transactions last month- Computable from IPP data | x | |
| | # outgoing transactions last month- Computable from IPP data | x | |
| | Number of customers paid last month- Computable from IPP data | x | |
| | Number of vendors paid last month- Computable from IPP data | x | |
| | Total amount coming in in the last 12 months- Computable from IPP data | x | |
| | Total amount outbound in the last 12 months- Computable from IPP data | x | |
| | Number of transactions with money coming in in the last 12 months- Computable from IPP data | x | |
| | Number of transactions with money going out in the last 12 months- Computable from IPP data | x | |
| | Total number of distinct customers in the last 12 months- Computable from IPP data | x | |
| | Total number of distinct vendors in the last 12 months- Computable from IPP data | x | |
| | This is the number of customers in this month that were already customers in the preceding 12 months- Computable from IPP data | x | |
| | The number of transactions these repeated customers accounted for- Computable from IPP data | x | |
| | The $ amount in these repeated customers represented- Computable from IPP data | x | |
| | The percent of all customers that month that are repeats from the previous 12 months- Computable from IPP data | x | |
| | The percent of all transactions that month that are from customers that are repeats from the previous 12 months- Computable from IPP data | x | |
| | The percent of the amount in that month that is from customers that are repeats from the previous 12 months. | x | |

FIG. 5.4

| Business Management Application (BMA) Data | BMA Data Items (Variable Names used in BMA) | User-entered data | Usage/Behavioral data |
|---|---|---|---|
| Underwriting financial statistics | (Accounts Receivable/Annual Sales)*365 days- Computable from IPP data | x | |
| | (Accounts Payable/Annual Cost of Goods Sold)*365 days- Computable from IPP data | x | |
| | Amount of loan principal $ scheduled to be repaid within 12 months- Computable from IPP data | x | |
| | Current Assets/Current Liabilities- Computable from IPP data | x | |
| | (Retaining Earnings FY '11 + Net Income '12) - Retained Earnings '12- Computable from IPP data | x | |
| | Net Income + Interest Expense + Taxes + Depreciation Expense + Amortization Expense- Computable from IPP data | x | |
| | Net Income + Interest Expense + Taxes + Depreciation Expense + Amortization Expense + Rent Expense- Computable from IPP data | x | |
| | (CPLTD+Interest Expense+Dividends+Taxes)- Computable from IPP data | x | |
| | (EBITDA-Internally Financed Capex)/Fixed Charges- Computable from IPP data | x | |
| | Gross Profit/Revenue- Computable from IPP data | x | |
| | (EBITDA/Interest Expense)- Computable from IPP data | x | |
| | (Inventory/Annual Cost of Goods Sold)*365 days- Computable from IPP data | x | |
| | Net Income/Revenue- Computable from IPP data | x | |
| | Total Interest Bearing Debt/TNW- Computable from IPP data | x | |
| | Total Interest Bearing Debt/EBITDA- Computable from IPP data | x | |
| | (EBITDA-Internally Financed Capex - Fixed Charges)- Computable from IPP data | x | |
| | Total Assets - Total Liabilities- Computable from IPP data | x | |
| | Total Assets - Intangibles - Affiliated A/R - Total Liabilities- Computable from IPP data | x | |
| | (FY '12 Revenue/FY '11 Revenue) -1 - Computable from IPP data | x | |
| | (FY '12 Net Income / FY '11 Net Income) -1 - Computable from IPP data | x | |
| Business Management Application (BMA) Data | BMA Data Items (Variable Names used in BMA) | User-entered data | Usage/Behavioral data |

FIG. 5.5

| | | | |
|---|---|---|---|
| Accounting software usage details | number of logins last quarter | | x |
| | last logged in date in QBO by any user in that company | | x |
| | Number of logins in January | | x |
| | Number of logins in February | | x |
| | Number of logins in March | | x |
| | Number of logins in April | | x |
| | Number of logins in May | | x |
| | Number of logins in June | | x |
| | Number of logins in July | | x |
| | Number of logins in August | | x |
| | Number of logins in September | | x |
| | Number of logins in October | | x |
| | Number of logins in November | | x |
| | Number of logins in December | | x |
| | number of times customer logs into a company. 5 users logging in once == 1 user logging in 5 times. | | x |
| | When customer clicks on Log Out. number of times customer logs out of a company. 5 users logging out once == 1 user logging out 5 times. | | x |
| | Number of logins from a mobile browser (phone, tablet). Not from the app. | | x |
| | Number of times customer added accounts last month- Computable from IPP data | | x |
| | Number of times customer added employees last month- Computable from IPP data | | x |
| | Number of times customer added customers last month. Includes customers imported from lists.- Computable from IPP data | | x |
| | Number of times customer created memorized reports last month | | x |
| | Number of times customer created (saved) checks last month- Computable from IPP data | | x |
| | Number of times customer created (saved) invoices last month- Computable from IPP data | | x |
| | Number of times customer 'received payments' last month- Computable from IPP data | | x |
| | Number of times customer 'Entered bills' in Vendor->Enter Bill last month- Computable from IPP data | | x |
| | Number of times customer created estimates- Computable from IPP data | | x |
| | Number of times customer created purchase orders- Computable from IPP data | | x |
| | Number of changes to the preferences. Any change to any preferences. | | x |

FIG. 5.6

| | | | |
|---|---|---|---|
| | Number of times customer exported to desktop. | | x |
| | Number of times customer invites another user to use QBO | | x |
| | Number of times customer added items last month. | | x |
| | Whether the customer added logo or not. | | x |
| | Number of times customer used reconciled function to reconcile bank transactions. | | x |
| | Number of credit card sales used last month- Computable from IPP data | | x |
| | Number of general journal entries made last month- Computable from IPP data | | x |
| | Number of credit card credits made last month- Computable from IPP data | | x |
| | Number of bill credits made last month- Computable from IPP data | | x |
| | Number of charge credits made last month- Computable from IPP data | | x |
| | Number of bills paid by check- Computable from IPP data | | x |
| | Number of bills paid by credit card- Computable from IPP data | | x |
| | Number of times customer created Charges (Customer->Charges)- Computable from IPP data | | x |
| | Number of times customer saved Transfers (Banking->Transfers)- Computable from IPP data | | x |
| | Number for reimbursed charges- Computable from IPP data- Computable from IPP data | | x |
| | Number of times charged for time (rather than goods)- Computable from IPP data- Computable from IPP data | | x |
| | Number of times customer saved cash purchases- Computable from IPP data- Computable from IPP data | | x |
| | Number of times customer saved cash sales- Computable from IPP data- Computable from IPP data | | x |
| | Number of times customer saved credit memos- Computable from IPP data- Computable from IPP data | | x |
| | Number of times customer saved credit refunds- Computable from IPP data- Computable from IPP data | | x |
| | Number of payroll adjustments made last month- Computable from IPP data- Computable from IPP data | | x |
| | Number of payroll checks made last month- Computable from IPP data- Computable from IPP data | | x |
| | Number of tax payments made- Computable from IPP data- Computable from IPP data | | x |
| | Number of payroll refunds- Computable from IPP data- Computable from IPP data | | x |
| | Number of times customer added vendors last month- | | x |

FIG. 5.7

| | | User-entered data | Usage/Behavioral data |
|---|---|---|---|
| | Computable from IPP data | | |
| | Number of departments | | x |
| | Number of transactions- Computable from IPP data | | x |
| | Number of times customer created (saved) statements. (Customer->Statements) | | x |
| | Number of users invited, during last month | | x |
| | Number of times customer created budgets last month. | | x |
| | Number of FI's connected- Computable from IPP data | | x |
| | Number of reminders that are currently set last month. | | x |
| | Number of inventory quantity adjustments- Computable from IPP data | | x |
| | Number of OLB manual download, undo txns, accept suggestions. | | x |
| | Number of OLB accounts set up | | x |
| | Number of times disables OLB accounts | | x |
| | Number of OLB automatic download | | x |
| | Number of times accepted OLB suggestions. | | x |
| | Number of invoices emailed | | x |
| | Number of statements emailed | | x |
| | Number of files uploaded as attachment (e.g., attach file to an Invoice) | | x |
| Business Management Application (BMA) Data | BMA Data Items (Variable Names used in BMA) | User-entered data | Usage/Behavioral data |
| Other financial tools used | Flag indicating whether company uses an EMS product (payroll) | | x |
| | Flag indicating whether company uses a PSD product (payments) | | x |
| Business Management Application (BMA) Data | BMA Data Items (Variable Names used in BMA) | User-entered data | Usage/Behavioral data |
| Equity, credit card debt and income -- values and percent differences | Company equity as of Dec 31, 2012- Computable from IPP data | x | |
| | Company equity as of Dec 31, 2011- Computable from IPP data | x | |
| | Company equity as of Dec 31, 2010- Computable from IPP data | x | |
| | Company equity as of Dec 31, 2009- Computable from IPP data | x | |
| | Credit card liability as of Dec 31, 2012- Computable from IPP data | x | |
| | Credit card liability as of Dec 31, 2011- Computable from | x | |

FIG. 5.8

| | | User-entered data | Usage/ Behavioral data |
|---|---|---|---|
| | IPP data | | |
| | Credit card liability as of Dec 31, 2010- Computable from IPP data | x | |
| | Credit card liability as of Dec 31, 2009- Computable from IPP data | x | |
| | Income in July, 2012- Computable from IPP data | x | |
| | Income in June, 2012- Computable from IPP data | x | |
| | Income in May, 2012- Computable from IPP data | x | |
| | Income in April, 2012- Computable from IPP data | x | |
| | Percent difference in equity in 2012 from 2011- Computable from IPP data | x | |
| | Percent difference in equity in 2011 from 2010- Computable from IPP data | x | |
| | Percent difference in equity in 2010 from 2009- Computable from IPP data | x | |
| | Percent difference in credit card liability in 2012 from 2011- Computable from IPP data | x | |
| | Percent difference in credit card liability in 2011 from 2010- Computable from IPP data | x | |
| | Percent difference in credit card liability in 2010 from 2009- Computable from IPP data | x | |
| | Percent difference in income in July from June - Computable from IPP data | x | |
| | Percent difference in income in June from May- Computable from IPP data | x | |
| | Percent difference in income in May from June- Computable from IPP data | x | |
| Business Management Application (BMA) Data | BMA Data Items (Variable Names used in BMA) | User-entered data | Usage/ Behavioral data |
| Firmographics -- summary of customer's payroll and accounting software information | Company's location state | x | |
| | Flag indicating if address is known | | x |
| | Flag indicating if billing address is same as business address | x | |
| | Email domain | x | |
| | Credit card type | x | |
| | Billing method | x | |
| | Industry | x | |
| | Flag indicating if direct deposit is desired at Initial Interview point | | x |
| | Flag indicating if might be a 941 filer | | x |
| | Flag indicating if gives paid time off | | x |
| | Flag indicating if have more than one work location | | x |

FIG. 5.9

| | | | |
|---|---|---|---|
| | Flag indicating if tracking time | | x |
| | Flag indicating if have contractors | | x |
| | Flag indicating if have only contractors | | x |
| | Flag indicating whether to use paper checks while waiting for direct deposit set up | | x |
| | Number of employees with early checks | x | |
| | Max check amount | x | |
| | Min check amount | x | |
| | Diff between max and min check amounts | x | |
| | Ratio of max to min check amounts | x | |
| | Percent of checks that are round dollars (no cents) | x | |
| | Percent of checks that are multiple of $100 | x | |
| | Percent of checks with zero dollars | x | |
| | Percent of employees that have a history | x | |
| | Percent of employees in first payroll | x | |
| | Flag indicating if have multiple period types | x | |
| | Flag indicating if deductions where used | x | |
| | Flag indicating if direct deposit is used | x | |
| | Flag indicating if has phantom employees | x | |
| | Percent of employees with partial information | x | |
| | Number of employees with complete information | x | |
| | Percent of employees that have a birthdate entered | x | |
| | Percent of employees that have a social security number entered | x | |
| | Percent of employees that have bank info entered | x | |
| | Percent of employees that have a paycheck | x | |
| | Number of states where payroll taxes need to be paid | x | |
| | Number of payroll taxes that need to be paid | x | |
| | Flag indicating if using tax defaults | x | |
| | Flag indicating if is a new employer | x | |
| | Flag indicating if is an acquired company | x | |
| | Tax rate for SUI | x | |
| | Tax rate for SDI | x | |
| | Tax rate for UHI | x | |
| | Tax rate for Other | x | |
| | Name of the company-Available directly through IPP | x | |
| | Type of industry | | x |
| | State where company is located-Available directly through IPP | x | |
| | Email domain of the company's email address-Available directly through IPP | x | |

FIG. 5.10

| | | | |
|---|---|---|---|
| | Company's area code-Available directly through IPP | x | |
| | Flag indicating whether EIN has been entered-Available directly through IPP | x | |
| | First month of the company's fiscal year-Available directly through IPP | x | |
| | First month of year that company reports income tax for (either same as fiscal start month or January)-Available directly through IPP | x | |
| | Which userid last modified a record | | x |
| | Specific category of the tax filer – SOLE Proprietor=1, Partnership=2, S Corporation=3, Corporation=4, Organization=5, Other=6-Available directly through IPP | x | |
| | Company's timezone | | x |
| | Does the company have a website URL-Available directly through IPP | x | |
| | Has a D&B number determined from external data | external | |
| | D&B sales volume determined from external data | external | |
| | D&B year started determined from external data | external | |
| Business Management Application (BMA) Data | BMA Data Items (Variable Names used in BMA) | User-entered data | Usage/ Behavioral data |
| Payroll Product Usage -- indicators of what features the customer is using | Flag indicating if deleted a paycheck | | x |
| | Flag indicating if modified a paycheck | | x |
| | Flag indicating if deleted a tax payment | | x |
| | Flag indicating if modified a tax payment | | x |
| | Number of system logins by customer support agent on behalf of company | | x |
| | Flag indicating if modified company filing name | | x |
| | Flag indicating if modified bank acct number | | x |
| | Flag indicating if modified bank routing number | | x |
| | Flag indicating if modified service level | | x |
| | Flag indicating if modified state tax rate | | x |
| | Flag indicating if deleted state tax rate | | x |
| | Flag indicating if deposit schedule was modified | | x |
| | Flag indicating if deposit schedule was deleted | | x |
| | Flag indicating if forms usage date was modified | | x |
| | Flag indicating if a hold was placed | | x |
| | Flag indicating if a hold was removed | | x |
| | Flag indicating if employee bank acct number was modified | | x |
| | Flag indicating if employee bank routing number was modified | | x |

FIG. 5.11

| | | | |
|---|---|---|---|
| | Flag indicating if employee social security or Medicare vetting failed | | x |
| | Flag indicating if prior quarter employer taxes vetting failed | | x |
| | Flag indicating success of employee paycheck history | | x |
| | Flag indicating success of current quarter payroll totals | | x |
| | Flag indicating success of prior quarters employer tax | | x |
| | Flag indicating of contractor payment was deleted | | x |
| | Flag indicating of contractor payment was modified | | x |
| | Flag indicating if deposit schedule was added | | x |
| | Flag indicating if state tax rate was added | | x |
| | Flag indicating unusual direct deposit activity | | x |
| | Flag indicating if contractor bank acct number was modified | | x |
| | Flag indicating if contractor bank routing number was modified | | x |
| | Flag indicating if work location address was modified | | x |
| | Flag indicating if employee work location was modified | | x |
| | Flag indicating if JIT data was edited | | x |
| | Flag indicating if Override to FUTA rate was modified | | x |
| | Flag indicating if service was terminated | | x |
| | Flag indicating if address verification was successful | | x |
| | Flag indicating if address verification failed | | x |
| | Flag indicating if address verification was overridden | | x |
| | Flag indicating if address verification was reset | | x |
| | Flag indicating if after the fact history was enabled | | x |
| | Flag indicating if account access was modified | | x |
| | Flag indicating if entity was changed and copied to new entity | | x |
| | Flag indicating user ID recovery | | x |
| | Flag indicating a change in user ID | | x |
| | Flag indicating if SUI rate update was declined | | x |
| | Flag indicating if SUI rate update was accepted | | x |
| | Flag indicating if contact phone number was modified | | x |
| | Flag indicating if email address was modified | | x |
| | Flag indicating if named status was modified | | x |
| | Flag indicating if add on was added | | x |
| | Flag indicating if add on was removed | | x |
| | Flag indicating if base package was changed | | x |
| | Flag indicating if service was reanimated | | x |
| | Flag indicating if credit card information was modified | | x |

FIG. 5.12

| | | | |
|---|---|---|---|
| | Flag indicating if contact name was modified | | x |
| | Flag indicating if credit limit was modified | | x |
| | Flag indicating if an employee was deleted | | x |
| | Flag indicating if timesheet shift was edited after paycheck | | x |
| | Flag indicating if timesheet shift was deleted after paycheck | | x |
| | Flag indicating if tax minder is enabled | | x |
| | Flag indicating if tax minder is disabled | | x |
| | Flag indicating if security key was generated | | x |
| | Flag indicating if security key was sent via voice | | x |
| | Flag indicating if security key was sent via SMS | | x |
| | Flag indicating if security key was sent via email | | x |
| | Flag indicating if security key validation failed | | x |
| | Flag indicating if security key validation was successful | | x |
| | Flag indicating if security key validation failed resulting in lockout | | x |
| | Flag indicating if security key is unlocked | | x |
| | Flag indicating if billing id was modified | | x |
| | Flag indicating if next billing date was modified | | x |
| Business Management Application (BMA) Data | BMA Data Items (Variable Names used in BMA) | User-entered data | Usage/ Behavioral data |
| Subscription details -- information concerning the customer's subscription of the payroll product | trial start date | | x |
| | subscription date | | x |
| | cancelation date | | x |
| | subscription plan (e.g. basic, plus) | | x |
| | account status (e.g. active, suspended) | | x |
| | acquisition channel | | x |
| | discounts/promotions applied | | x |
| | upgrade_date (if applicable) | | x |
| Business Management Application (BMA) Data | BMA Data Items (Variable Names used in BMA) | User-entered data | Usage/ Behavioral data |
| Subscription billing details -- details on subscription billing | date of 1st bill, 2nd bill, 3rd bill etc. | | x |
| | charge amount of 1st bill, 2nd bill, 3rd bill etc. | | x |
| | # of billings | | x |
| | time between signup & 1st bill | | x |
| | time between 1st check and 1st bill | | x |
| | time between signup and last bill | | x |

FIG. 5.13

| | | User-entered data | Usage/Behavioral data |
|---|---|---|---|
| | time between 1st check and last bill | | x |
| | time since last check | | x |
| | past due invoices | | x |
| Payroll processing details -- details of customer's payroll processing | date of 1st payroll, 2nd payroll, 3rd payroll etc. | | x |
| | number of employees in 1st payroll, 2nd payroll, 3rd payroll etc. | x | |
| | total amount of payroll processed in 1st payroll, 2nd payroll, 3rd payroll etc. | x | |
| | # of logins in last 30 days | | x |
| | average logins | | x |
| | # of checks in last 30 days | x | |
| | average # of checks | x | |
| | # of employees paid in last 30 days | x | |
| | average # of employees paid | x | |
| | time since last raise | x | |
| Attrition details -- information concerning customers who leave the product | cancel request date | | x |
| | method of initiating disconnection (e.g. called agent, exit interview in-product, system-generated) | | x |
| | cancel reason | | x |
| | future method | | x |
| | NPS for cancellers | | x |
| Payroll setup Statistics -- set up information for customers using Online Payroll | date(s) clicked on "Set up payroll" | | x |
| | no. of times clicked on "skip for now" during the setup process | | x |
| | date(s) employees were added | | x |
| | flag for having paid employees this year | | x |
| | flag for having more than one office location with employees | | x |
| | pay schedule for each employee (every week, every other week, every month etc.) | x | |
| | date employees setup completed | | x |
| | date taxes setup completed | | x |
| | date(s) clicked on "time tracking" | | x |
| | date "time tracking" was activated | | x |
| Business Management Application (BMA) Data | BMA Data Items (Variable Names used in BMA) | User-entered data | Usage/Behavioral data |
| Customer details -- information on customers | revenue in the last 30 days | x | |
| | average revenue | x | |
| | # invoices in the last 30 days | x | |
| | average # of invoices | x | |

FIG. 5.14

| | | | |
|---|---|---|---|
| who use BMA | # of customers in customer list now | x | |
| | # of customers vs. 90 days ago | x | |
| | time between QB and IOP | | x |
| Pattern changes -- changes in usage | very recent activity vs. what's normal for you | | x |
| Transaction Statistics | Sum of lifetime volume | x | |
| | Sum of $ returns over last 30 days | x | |
| | Sum of $ returns over lifetime | x | |
| | Sales count in last 30 days | x | |
| | Count of total sales in last 30 days | x | |
| | total sales amount for current day | x | |
| Chargebacks Statistics | Total $ chargebacks in last 30 days | x | |
| | Total $ chargebacks over lifetime | x | |
| | Total chargeback counts over lifetime | x | |
| Age Statistics | days since sign up | | x |
| | days since first transaction | | x |
| | months as a business prior to sign up | x | |

FIG. 5.15

ALGORITHM AND MODELS FOR CREDITWORTHINESS BASED ON USER ENTERED DATA WITHIN FINANCIAL MANAGEMENT APPLICATION

BACKGROUND

Banks often have trouble lending to a small business because they do not have an effective approach to assess the quality of a small business, and often default to using the small business proprietor's credit scores.

SUMMARY

In general, in one aspect, the invention relates to a method for modeling risk of a derogatory financial event. The method includes obtaining, from a business management application (BMA) used by a plurality of business entities, historic user entered data and historic usage statistics, wherein the historic user entered data are entered by the plurality of business entities and represents business activities of the plurality of the business entities, wherein the historic usage statistics represent how the plurality of business entities use the BMA, generating, by a computer processor and based on the historic user entered data and the historic usage statistics, a training data set for modeling the risk of the derogatory financial event, wherein generating the training data set includes (a) identifying a portion of the plurality of business entities, wherein each business entity within the portion has the derogatory financial event occurred at a historic time point, (b) identifying a subset of the historic user entered data and historic usage statistics that belongs to a first business entity within the portion, wherein the subset corresponds to a first time period preceding the derogatory financial event of the first business entity by a pre-determined time gap, (c) assigning, based on the derogatory financial event of the first business entity, a derogatory status to the subset belonging to the first business entity, and (d) including, in the training data set, the subset belonging to the first business entity and the derogatory status assigned to the subset, generating, by the computer processor and based on the training data set, a risk model of the derogatory financial event, obtaining, from the BMA, additional user entered data and additional usage statistics, wherein the additional user entered data are entered by a second business entity separate from the plurality of business entities and represents the business activities of the second business entity during a second time period, wherein the additional usage statistics represent how the second business entity uses the BMA during the second time period, and analyzing, by the computer processor and using the risk model of the derogatory financial event, the additional user entered data and additional usage statistics to determine the probability of the derogatory financial event occurring to the second business entity within the pre-determined time gap following the second time period.

In general, in one aspect, the invention relates to a system for modeling risk of a derogatory financial event. The system includes a computer processor, a business management application (BMA) used by a plurality of business entities to manage business activities of the plurality of business entities, memory storing instructions executable by the processor, wherein the instructions include (i) a risk model generator configured to obtain, from the BMA, historic user entered data and historic usage statistics, wherein the historic user entered data are entered by the plurality of business entities and represents business activities of the plurality of the business entities, wherein the historic usage statistics represent how the plurality of business entities use the BMA, generate, based on the historic user entered data and the historic usage statistics, a training data set for modeling the risk of the derogatory financial event, wherein generating the training data set includes (a) identifying a portion of the plurality of business entities, wherein each business entity within the portion has the derogatory financial event occurred at a historic time point, (b) identifying a subset of the historic user entered data and historic usage statistics that belongs to a first business entity within the portion, wherein the subset corresponds to a first time period preceding the derogatory financial event of the first business entity by a pre-determined time gap, (c) assigning, based on the derogatory financial event of the first business entity, a derogatory status to the subset belonging to the first business entity, and (d) including, in the training data set, the subset belonging to the first business entity and the derogatory status assigned to the subset, and generate, based on the training data set, a risk model of the derogatory financial event, wherein the risk model represents a probability of the derogatory financial event occurring to the plurality of business entities, (ii) a risk profile generator configured to obtain, from the BMA, additional user entered data and additional usage statistics, wherein the additional user entered data are entered by a second business entity separate from the plurality of business entities and represents the business activities of the second business entity during a second time period, wherein the additional usage statistics represent how the second business entity uses the BMA during the second time period, and analyze, using the risk model of the derogatory financial event, the additional user entered data and additional usage statistics to determine the probability of the derogatory financial event occurring to the second business entity within the pre-determined time gap following the second time period, and (iii) a repository configured to store the training data set and the risk model of the derogatory financial event.

In general, in one aspect, the invention relates to a non-transitory computer readable medium storing instructions for modeling risk of a derogatory financial event. The instructions, when executed by a computer processor, include functionality for obtaining, from a business management application (BMA) used by a plurality of business entities, historic user entered data and historic usage statistics, wherein the historic user entered data are entered by the plurality of business entities and represents business activities of the plurality of the business entities, wherein the historic usage statistics represent how the plurality of business entities use the BMA, generating, based on the historic user entered data and the historic usage statistics, a training data set for modeling the risk of the derogatory financial event, wherein generating the training data set includes (a) identifying a portion of the plurality of business entities, wherein each business entity within the portion has the derogatory financial event occurred at a historic time point, (b) identifying a subset of the historic user entered data and historic usage statistics that belongs to a first business entity within the portion, wherein the subset corresponds to a first time period preceding the derogatory financial event of the first business entity by a pre-determined time gap, (c) assigning, based on the derogatory financial event of the first business entity, a derogatory status to the subset belonging to the first business entity, and (d) including, in the training data set, the subset belonging to the first business entity and the derogatory status assigned to the subset, generating, based on the training data set, a risk model of the derogatory financial event, obtaining, from the BMA, additional user entered data and additional usage statistics, wherein the additional user entered data are entered by a second business entity separate from the plurality of business entities and represents the business activities of the second business entity during a second time period, wherein the additional usage statistics represent how the second business entity uses the BMA during the second time period, and analyzing, using the risk model of the derogatory financial event, the additional user entered data and additional usage statistics to determine the probability of the derogatory financial event occurring to the second business entity within the predetermined time gap following the second time period.

Other aspects of the invention will be apparent from the following description and the appended claims.

BRIEF DESCRIPTION OF DRAWINGS

FIGS. 2.1 and 2.2 show method flow charts in accordance with one or more embodiments of the invention.

FIGS. 3.1 and 3.2 show an example in accordance with one or more embodiments of the invention.

FIGS. 5.1, 5.2, 5.3, 5.4, 5.5, 5.6, 5.7, 5.8, 5.9, 5.10, 5.11, 5.12, 5.13, 5.14, and 5.15 show TABLE 1 in accordance with one or more embodiments of the invention.

DETAILED DESCRIPTION

Figure 1:
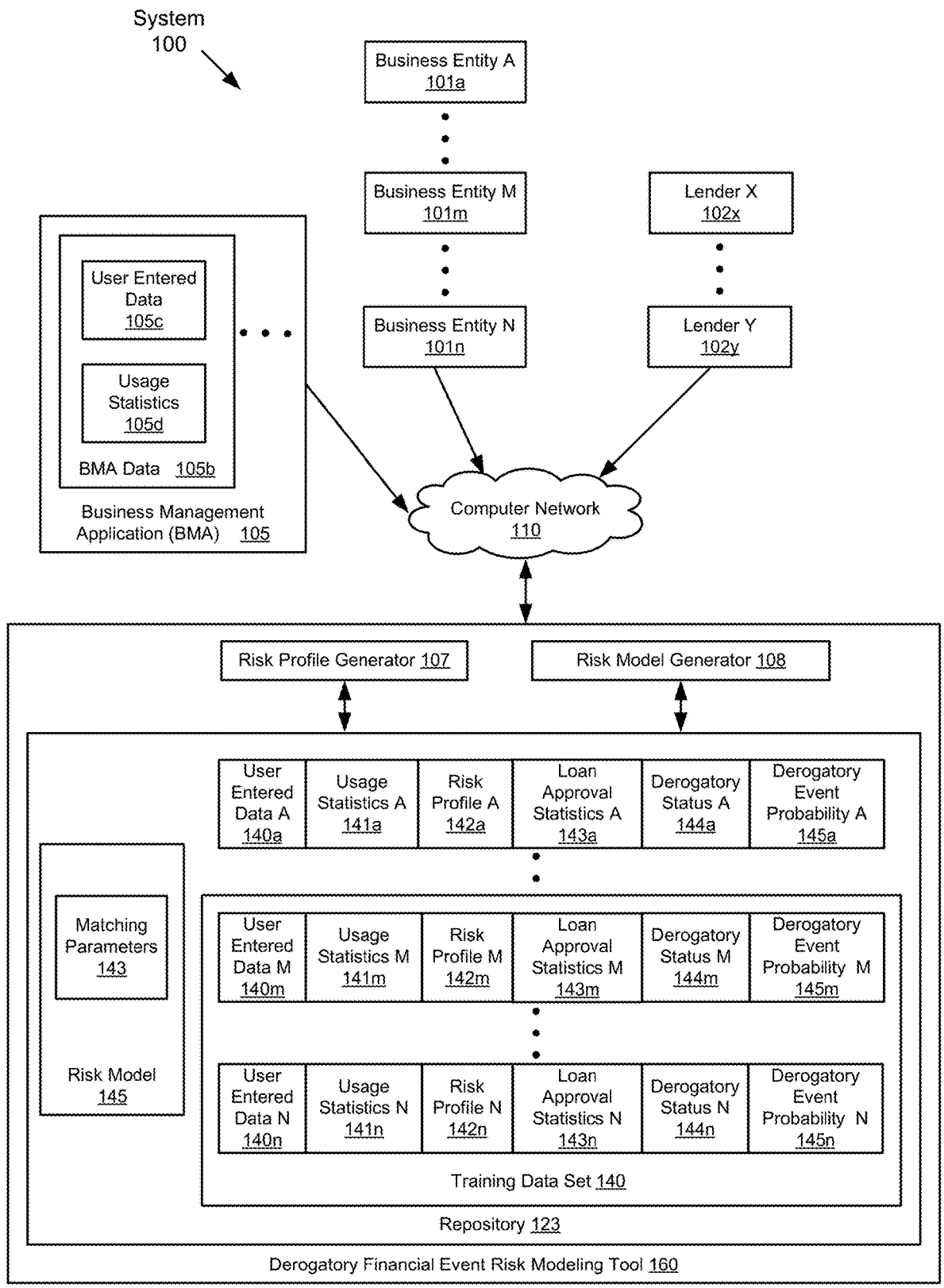
FIG. 1 shows a block diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, system, and computer readable medium to generate a risk profile of a small business (SMB) using a risk model based on accounting data and other third party business management application (BMA) data of the SMB. In particular, the risk model is generated using a training data set that includes accounting data and other third party BMA data of multiple SMBs over particular time periods related to historic derogatory events of these SMBs. In one or more embodiments, the BMA may be an accounting application, payroll application, tax preparation application, personnel application, etc. used as a software-as-a-service (SaaS) by the SMBs. Generated using the risk model, the risk profile of the SMB represents the likelihood of a derogatory financial event (e.g., to be delinquent and/or to default on a loan) occurring to the SMB. In one or more embodiments, the risk profile is provided to a lender for making an expedient lending decision with respect to the SMB. In one or more embodiments, statistics of lenders' lending decisions based on provided risk profiles are analyzed to generate a correlation. Accordingly, the algorithm(s) used to generate the risk profile from the accounting data and other third party BMA data are adjusted to maximize the correlation.

FIG. 1 shows a block diagram of a system (100) in accordance with one or more embodiments of the invention. Specifically, the system (100) includes business entities (e.g., business entity A (101a)), lenders (e.g., lender X (102x)), a BMA (105) used by the business entities, and a derogatory financial event risk modeling tool (160) that are coupled via a computer network (110). In one or more embodiments of the invention, the derogatory financial event risk modeling tool (160), or a portion thereof, may be integrated with the BMA (105). In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

In one or more embodiments of the invention, the computer network (110) may include a cellular phone network, a wide area network, a local area network, a public switched telephone network (PSTN), or any other suitable network that facilitates the exchange of information from one part of the network to another. In one or more embodiments, the computer network (110) is coupled to or overlaps with the Internet.

In one or more embodiments, each of the business entities (e.g., business entity A (101a), business entity M (101m), business entity N (101n)), the lenders (e.g., lender X (102x), lender Y (102y)), the BMA (105), and the derogatory financial event risk modeling tool (160) may include any computing device configured with computing, data storage, and network communication functionalities. In one or more embodiments, the BMA (105) may be an accounting application, a tax preparation application, a payroll application, a personnel application, or any business management application. In one or more embodiments, the BMA (105) is provided by an application service provider, such as a software as a service (SaaS). For example, the BMA (105) may be operated by the application service provider (ASP) and accessed by the business entities (e.g., business entity A (101a), business entity M (101m), business entity N (101n)) on a subscription basis.

In one or more embodiments, BMA data (e.g., BMA data (105b) including user entered data (105c) and usage statistics (105d) of the business entity A (101a)) is generated in response to the business entities accessing the BMA (105). For example, the user entered data (105c) may include profile/configuration information specified by the business entity A (101a). In particular, such profile/configuration information may be entered into the BMA (105) by a user associated with the business entity A (101a), who may be an employee, a consultant, a business owner, etc. of the business entity A (101a). In one or more embodiments, at least a portion of the user entered data (105c) represents a measure of business activities performed by the business entity A (101a). In addition, the usage statistics (105d) may include statistics or other behavioral information representing how the BMA (105) is used by the business entity A (101a). Examples of the BMA data (105b) are shown in TABLE 1 shown consecutively in FIGS. 5.1, 5.2, 5.3, 5.4, 5.5, 5.6, 5.7, 5.8, 5.9, 5.10, 5.11, 5.12, 5.13, 5.14, and 5.15. In particular, TABLE 1 lists a number of example BMA data each corresponding to a category of BMA data items. Although the BMA data (e.g., BMA data (105b)) is shown in FIG. 1 as stored within the BMA (105), in one or more embodiments, the BMA data (e.g., BMA data (105b)) may not persist within the BMA (105). In one or more embodiments, the user entered data (105c) and usage statistics (105d) of the business entity A (101a) are stored in a repository (123) of the derogatory financial event risk modeling tool (160) as the user entered data A (140a) and usage statistics A (141a). Similarly, the BMA data (105b) of the business entity M (101m) and business entity N (101n) may also be stored in the repository (123) as the user entered data M (140m)/usage statistics M (141m) and user entered data N (140n)/usage statistics N (141n), respectively. For example, information stored in the user entered data A (140a)/usage statistics A (141a), user entered data M (140m)/usage statistics M (141m), and user entered data N (140n)/usage statistics N (141n) may be retrieved and used by the derogatory financial event risk modeling tool (160), as needed, instead of persisting within the BMA (105).

As shown in FIG. 1, the derogatory financial event risk modeling tool (160) includes a risk profile generator (107), a risk model generator (108), and the repository (123) storing information used and/or generated by the risk profile generator (107) and the risk model generator (108).

In one or more embodiments, the risk profile generator (107) is configured to obtain the BMA data (105b) from the BMA (105) for storing in the repository (123). For example, the user entered data (105c)/usage statistics (105d) included in the BMA data (105b) may be stored as the user entered data A (140a) and usage statistics A (141a) in the repository (123). Similarly, other BMA data associated with the business entity M (101m) and business entity N (101n) may be stored as the user entered data M (140m)/usage statistics M (141m) and user entered data N (140n)/usage statistics N (141n), respectively in the repository (123).

In one or more embodiments, the user entered data M (140m)/usage statistics M (141m) and user entered data N (140n)/usage statistics N (141n) are obtained from the BMA (105) by the risk model generator (108) and included in a training data set (140) for generating the risk model (145). For example, the user entered data M (140m)/usage statistics M (141m) and user entered data N (140n)/usage statistics N (141n) may be used as input data portion of the training data set (140). In addition, the training data set (140) also includes a ground truth portion, such as the loan approval statistics and derogatory status that will be described later.

Generally, actual occurrences of payment delinquency and/or loan default by the borrowers are tracked and compiled by lenders (e.g., lender X (102x), lender Y (102y)) as loan delinquency statistics. In addition, actual occurrences of other derogatory financial events may be tracked and compiled by other entities, such as a government agency, trade association, etc. In one or more embodiments, actual occurrences of loan approval, payment delinquency, loan default, and/or other derogatory financial events may also be recorded or otherwise identifiable in the BMA (105). In one or more embodiments, information regarding actual occurrences of payment delinquency, loan default, and/or other derogatory financial events are obtained by the derogatory financial event risk modeling tool (160) and stored in the repository (123) as derogatory status A (144a), derogatory status M (144m), and derogatory status N (144n) corresponding to the business entity A (101a), business entity M (101m), and business entity N (101n), respectively. Similarly, information regarding actual loan approvals are obtained by the derogatory financial event risk modeling tool (160) and stored in the repository (123) as loan approval statistics A (143a), loan approval statistics M (143m), and loan approval statistics N (143n). Note that each of the loan approval statistics A (143a), loan approval statistics M (143m), loan approval statistics N (143n), derogatory status A (144a), derogatory status M (144m), and derogatory status N (144n) may include wither a positive status or a negative status (e.g., approved versus declined, occurred versus not occurred) and may be compiled over the same time period for some business entities (e.g., business entity M (101m), business entity N (101n)) and compiled over different time periods for other business entities (e.g., business entity A (101a)).

In one or more embodiments, the risk model (145) is a machine learning model (e.g., based on an adaptively-determined matching algorithm such as a rule ensemble algorithm) that predicts a response using the input data as predictors. For example, the response may include a loan approval or an occurrence of a derogatory financial event. During a training phase, the training data set (140), or a qualified portion thereof is used to train the risk model (145) by adjusting the matching parameters (143) to maximize a correlation between the predicted responses from the risk model (145) and the ground truth contained in the training data set (140). In one or more embodiments, the user entered data and usage statistics in the training data set (140) are referred to as historic user entered data and historic usage statistics. In one or more embodiments, the risk model (145) is used by the risk profile generator (107) to generate risk profiles of business entities based on either the historic user entered data and historic usage statistics available in the training data set (140) or based on additional user entered data and usage statistics of other business entities not included in the training data set (140), such as the business entity A (101a).

In one or more embodiments, the user entered data A (140a)/usage statistics A (141a), user entered data M (140m)/usage statistics M (141m), and user entered data N (140n)/usage statistics N (141n) are analyzed by the risk profile generator (107) to generate the risk profile A (142a) of the business entity A (101a), the risk profile M (142m) of the business entity M (101m), and the risk profile N (142n) of the business entity N (101n), respectively. In one or more embodiments, the risk profile (e.g., risk profile A (142a), risk profile M (142m), and risk profile N (142n)) includes one or more of a number score, a percentage score, a letter score, or other suitable type of score. Such score(s) may be used to predict a probability of default, a probability of non-default, a probability of delinquency, a probability of non-delinquency, a probability of loan approval, a probability of loan declination, and/or a probability of other derogatory financial events, such as a bankruptcy event, a debt collection event, a lien attach event. In one or more embodiments, the probability of a derogatory financial event occurring for a business entity as predicted based on the risk profile is stored in the repository (123). For example, the derogatory event probability A (145a), derogatory event probability M (145n), and derogatory event probability N (145n) may be predicted based on the risk profile A (142a) of business entity A (101a), risk profile M (142m) of business entity M (101m), and risk profile N (142n) of business entity N (101n), respectively.

In one or more embodiments, the risk profiles (e.g., the risk profile A (142a), risk profile M (142m), risk profile N (142n)) are generated by the risk profile generator (107) using the risk model (145). As noted above, the risk model (145) may be based on an adaptively-determined matching algorithm such that the risk profiles correlate with actual occurrences of payment delinquency, loan default, and/or other derogatory financial event of the corresponding business entities (e.g., business entity A (101a), business entity M (101m), business entity N (101n)), at respective historic time points. Accordingly, the risk profiles of business entities within the training data set (140) also indicate probabilities that future payment delinquency, loan default, and/or other derogatory financial event of the corresponding business entities may also occur subsequent to the historic time points. In addition, the risk profiles of other business entities not within the training data set (140) indicate probabilities that future payment delinquency, loan default, and/or other derogatory financial event may also occur to these other business entities at some future time points.

As noted above, the aforementioned adaptively-determined matching algorithm includes a machine learning algorithm, such as a rule ensemble algorithm known to those skilled in the art. For example, the risk profile A (142a) of the business entity A (101a) may be generated by the risk profile generator (107) using the machine learning algorithm that has been trained based on risk-profile-to-derogatory-status correlation and/or risk-profile-to-loan-approval-status correlation of other business entities, such as the business entity M (101m), business entity N (101n), etc. As shown in FIG. 1, the risk profile M (142m), risk profile N (142n), loan approval statistics M (143m), loan approval statistics N (143n), derogatory status M (144m), and derogatory status N (144n) are generated/obtained prior to generating the risk profile A (142a) and are used as part of a training data set (140) for iteratively adjusting the machine learning algorithm before generating the risk profile A (142a) therewith. "Iteratively adjusting" is referred to as "training" in the context of machine learning algorithm. In one or more embodiments, the risk model generator (108) is configured to iteratively adjust (i.e., train) the adaptively-determined matching algorithm during a training phase using a qualified portion of the training data set (140). In one or more embodiments, the risk model generator (108) generates the qualified portion of the training data set (140) by at least (i) identifying business entities within a section of the training data set (140) that have derogatory financial events occurred at respective historic time points (e.g., based on the derogatory status M (144m) and derogatory status N (144n) assigned to the business entity M (101m) and the business entity N (101n), respectively), (ii) identifying a subset of the historic user entered data and usage statistics that belongs to each business entity within the section of the training data set (140), where the subset corresponds to a particular time period preceding the derogatory financial event of the corresponding business entity by a pre-determined time gap (e.g., one year time period that is six months prior to a loan default event where the time gap is six months), (iii) aggregating into the qualified portion of the training data set (140) multiple subsets of the historic user entered data and usage statistics of multiple business entities that encountered derogatory financial events. Accordingly, the risk model generator (108) generates the risk model (145) using the qualified portion of the training data set (140).

Based on the pre-determined time gap that is specified to qualify the training data set (140), the risk model (145) may be used to predict the probability of the derogatory financial event occurring to the business entity A (101a) at a future time point that is at the pre-determined time gap from the time of analysis. For example, if the historic user entered data and usage statistics are qualified based on one year time period that is six months prior to a loan default event, the risk model (145) may be used to predict the probability of the loan default event occurring to the business entity A (101a) within six months from the time of analysis. In other words, the probability that the business entity A (101a) may encounter a loan default event within six months in the future may be predicted using the risk model (145) based on the user entered data A (140a) and usage statistics A (141a) that are collected over one year period prior to the time of analysis. In such example, the risk profile A (142a) may include a score that represents the probability that the business entity A (101a) may encounter a loan default event within six months in the future.

In one or more embodiments, once generated, the risk profile A (142a) is provided by the risk profile generator (107) to the business entity A (101a). Accordingly, the business entity A (101a) may submit the risk profile A (142a) to one or more lenders (e.g., lender X (102x), lender Y (102y)) to apply for a loan. If such loan application is approved and initiated, the corresponding loan servicing history may be tracked for compiling the payment delinquency and/or default statistics to generate the derogatory status A (144a) associated with the business entity A (101a). In one or more embodiments, the user entered data A (140a), the usage statistics A (141a), the risk profile A (142a), the corresponding loan approval statistics A (143a), and the resultant derogatory status A (144a) may be further included in the training data set (140) to generate an updated version of the training data set (140). Subsequently, this updated version of the training data set (140) may be used to generate additional risk profiles for other business entities and/or to update existing risk profiles (e.g., the risk profile A (142a), risk profile M (142m), risk profile N (142n), etc.) as references for future loan applications.

FIGS. 2.1 and 2.2 show method flow charts for in accordance with one or more embodiments of the invention. In one or more embodiments of the invention, the method of FIGS. 2.1 and 2.2 may be practiced using the system (100) described in reference to FIG. 1 above. In one or more embodiments of the invention, one or more of the steps shown in FIGS. 2.1 and 2.2 may be omitted, repeated, and/or performed in a different order than that shown in FIGS. 2.1 and 2.2. Accordingly, the specific arrangement of steps shown in FIGS. 2.1 and 2.2 should not be construed as limiting the scope of the invention.

FIG. 2.1 shows a flow chart for training a risk model based on information obtained from a business management application (BMA) used by multiple business entities. Initially in Step 201, BMA data of business entities is obtained from the BMA. In one or more embodiments, the BMA may be an accounting application, a tax preparation application, a payroll application, a personnel application, or any business management application. In one or more embodiments, the BMA is provided by an application service provider, such as a software as a service (SaaS). For example, the BMA may be operated by the application service provider (ASP) and accessed by the business entities on a subscription basis. In one or more embodiments, the BMA data include user entered data and usage statistics described in reference to TABLE 1 above.

In Step 202, loan approval statistics and loan default statistics of the business entities are obtained from lenders providing loans to the business entities. Generally, business entities apply for business loans from such lenders who may approve or decline the loan application. For those loan applications that are approved, actual occurrences of loan payment delinquency and loan default are tracked and compiled by the lenders as loan default statistics. In one or more embodiments, the loan approval statistics and loan default statistics of the business entities are obtained from the lenders based on certain business agreements. For example, the business entities may have the ability to opt-in as part of the loan application to release such information to business partners of the lenders.

In Step 203, an adaptively-determined matching algorithm is iteratively adjusted to match risk profiles of the business entities to the corresponding loan approval statistics and loan default statistics. In one or more embodiments, the risk profile includes one or more of a probability of default, a probability of non-default, a probability of delinquency, a probability of non-delinquency, a probability of loan approval, and a probability of loan declination, each represented by a number score, a percentage score, a letter score, or other suitable type of score.

In one or more embodiments, the risk profiles are modeled as a function of the BMA data of the business entities using the adaptively-determined matching algorithm. In other words, the adaptively-determined matching algorithm is used to analyze the BMA data and generate the corresponding risk profiles. In one or more embodiments, the adaptively-determined matching algorithm includes a machine learning algorithm, such as a rule ensemble algorithm known to those skilled in the art. For example, the training data set of the machine learning algorithm includes the BMA data, loan approval statistics, and loan default statistics of the business entities. Accordingly, various parameters of the machine learning algorithm are iteratively adjusted during a training phase to match the modeled risk profile (e.g., predicted loan approval/declination, predicted loan delinquency, and predicted loan default) to the actual loan approval statistics and actual loan default statistics in the training data set. Iteratively adjusting the parameters of the machine learning algorithm is referred to as "training" the machine learning algorithm. For example, training the machine learning algorithm may be as described in reference to the risk profile generator (107) depicted in FIG. 1 above.

In Step 204, subsequent to the training phase of the adaptively-determined matching algorithm the adaptively-determined matching algorithm is used to generate the risk profile of a particular business entity based on the BMA data of the particular business entity. In one or more embodiments, this particular business entity is one of the business entities whose BMA data are included in the training data set of the adaptively-determined matching algorithm. In such embodiments, the risk profile generated in the Step 204 is an updated version of a previous risk profile of this particular business entity that was used as part of the training data set in the Step 203. In one or more embodiments, this particular business entity is separate from those other business entities whose BMA data are included in the training data set of the adaptively-determined matching algorithm.

In Step 205, a determination is made as to whether the particular business entity uses the risk profile to apply for a loan. If the determination is YES, i.e., the particular business entity submitted a loan application based on the risk profile generated in Step 204, the method returns to Step 202 where loan approval statistics and any subsequent loan default statistic are added to the training data set of the adaptively-determined matching algorithm. If the determination is NO, i.e., the particular business entity has not submitted any loan application based on the risk profile generated in Step 204, the method proceeds to Step 206.

In Step 206, a loan proposal is generated based on similar risk profiles of a group of business entities. In one or more embodiments, a cluster of similar risk profiles are extracted from a risk profile collection using a pre-determined clustering algorithm and based on a pre-determined similarity measure. Accordingly, a loan proposal is generated based on the cluster of similar risk profiles. For example, the loan proposal may include a range of loan amounts, interest rate terms, maturity time period, borrower covenants, and other conventional financial parameters of a loan. In one or more embodiments, a statistical return for a lender is computed for the loan proposal based on characteristics (e.g., probability of default, probability of non-default, etc. each represented by a number score, a percentage score, a letter score, etc.) of the similar risk profiles in the cluster. For example, an effective average rate of return for a simple example loan proposal may be computed by deducting a defaulted loan amount multiplied by the probability of default from the anticipated interest collection of a non-defaulted loan amount multiplied by a simple fixed rate and the probability of non-default over the maturity time period.

In one or more embodiments, the loan proposal is presented to one or more lenders and the group of business entities corresponding to the cluster of similar risk profiles. For example, a lender may decide to offer a loan program based on the loan proposal. In another example, the group of business entities may jointly request a loan program from a lender based on the loan proposal.

In Step 207, a target risk profile specified by one or more lenders may be matched to business entities sharing similar risk profiles. In one or more embodiments, one or more clusters of similar risk profiles are extracted from a risk profile collection using a pre-determined clustering algorithm and based on a pre-determined similarity measure. In addition, at least one of these clusters is selected as being similar to the target risk profile. Accordingly, a list of business entities corresponding to the selected at least one cluster are presented to the one or more lenders. For example, a lender may decide to offer a loan program based on the target risk profile and market the loan program to the business entities on the list.

FIG. 2.2 shows a flow chart for qualifying a training data set used by the workflow shown in FIG. 2.1 above. Specifically, the qualified training data set is used to train the risk model based on information obtained from the BMA as described in reference to FIG. 2.1 above.

Initially in Step 211, historic user entered data and historic usage statistics are obtained from a business management application (BMA) used by a number of business entities. In particular, the historic user entered data are entered by the business entities and represents business activities of the business entities. The historic usage statistics represent how the business entities use the BMA. In one or more embodiments, the historic user entered data and historic usage statistics include one or more entries of the TABLE 1 above.

In Steps 212 through 215, a training data set for modeling the risk of a derogatory financial event is generated based on the historic user entered data and the historic usage statistics. Specifically, in Step 212, a portion of the business entities are identified where each business entity within the portion has the derogatory financial event occurred at a historic time point. In one or more embodiments, the derogatory financial event includes one or more of a bankruptcy event, a debt collection event, a lien attach event, and a payment delinquency event.

In Step 213, a subset of the historic user entered data and historic usage statistics is identified that belongs to a first business entity within the portion. Specifically, the subset corresponds to a first time period preceding the derogatory financial event of the first business entity by a pre-determined time gap. For example, the subset may include BMA data corresponding to a one year period ending at a time point that is six months prior to a loan default event that occurred to the first business entity.

In Step 214, based on the derogatory financial event of the first business entity, a derogatory status is assigned to the subset belonging to the first business entity.

In Step 215, the subset belonging to the first business entity and the derogatory status assigned to the subset is included in the training data set. In one or more embodiments, the training data set may include BMA data encompassing an extended time period while the subset is included in a qualified portion of the training data set. In other words, the training data set may be qualified based on the time period restricted based on a pre-determined length of time period and the pre-determined time gap.

In Step 216, a risk model of the derogatory financial event is generated based on the training data set. If the training data set includes BMA data encompassing the extended time period, the risk model is generated based the aforementioned qualified portion of the training data set. In one or more embodiments, generating the risk model of the derogatory financial event includes iterations of the following steps (i) and (ii) that iteratively adjust an adaptively-determined matching algorithm within the risk model. In one or more embodiments, the adaptively-determined matching algorithm includes a rule ensemble algorithm.

In step (i), the training data set, or a qualified portion of the training data set is analyzed using the adaptively-determined matching algorithm to generate risk profiles of the business entities contributing to the training data set. In one or more embodiments, each risk profile includes a calculated probability of the derogatory financial event occurring to a corresponding business entity. In one or more embodiments, each risk profile includes a score that may be used to calculate the probability of the derogatory financial event occurring to a corresponding business entity.

In step (ii), the adaptively-determined matching algorithm is adjusted to increase a correlation between the calculated probability in the risk profiles and the actual derogatory financial event occurred to each business entity within the portion.

In Step 217, additional user entered data and additional usage statistics are obtained from the BMA. Specifically, the additional user entered data are entered by a second business entity separate from the business entities contributing to the training data set and represents the business activities of the second business entity during a second time period. The additional usage statistics represent how the second business entity uses the BMA during the second time period. In one or more embodiments, the additional user entered data and additional usage statistics include one or more entries of the TABLE 1 above.

In Step 218, using the risk model of the derogatory financial event, the additional user entered data and additional usage statistics are analyzed to determine the probability of the derogatory financial event occurring to the second business entity within the pre-determined time gap following the second time period.

FIG. 3.1 shows an example flow (300) of generating a risk model in accordance with one or more embodiments of the invention. Specifically, the flow (300) uses business management application (BMA) data as a training data set to build a model (303) (i.e., risk model) to predict delinquent behavior. As shown in FIG. 3.1, the flow (300) uses both user-entered data and usage/behavioral data of the BMA data (301) to predict whether a company has defaulted on a loan or has been past due at some point during the life of the loan. The training data set includes a large number (e.g., hundreds) of companies for whom historical delinquent status (302) on a loan is known. Further, a large number of user-entered data and usage/behavioral data (e.g., over one hundred) are included for each company in the training data set.

A rule ensemble algorithm is used to build the predictive model (303) that is used to score a company on its likelihood of exhibiting delinquent behavior. A "rules ensemble" is a particular form of the machine learning methodology referred to as "ensembling," where multiple simple models (base learners) are combined into one complex model to improve accuracy. This type of model can be described as an additive expansion of the form $F(x)=a_0+a_1*b_1(x)+a_2*b_2(x)+ \ldots +a_M*b_M(x)$ where the $b_j(x)$'s are the base-learners and x is a vector $[x_1, x_2, \ldots x_N]$ representing the BMA data items (301). As noted above, N is a large number, such as a number over one hundred.

In the case of a rules ensemble, the $b_j(x)$ terms are conjunctive rules of the form "if $x_1>22$ and $x_2>27$ then 1 else 0" or linear functions of a single variable—e.g., $b_j(x)=x_j$. Using base-learners of this type is efficient because they constitute easily interpretable statements about attributes $x_j$. They also preserve the desirable characteristics of Decision Trees such as efficient handling of categorical attributes, robustness to outliers in the distribution of x, etc.

The example rules ensemble used in the flow (300) builds a model (303), represented as F(x), in a three-step process:
 a. Build a tree ensemble (one where the $b_j(x)$'s are decision trees),
 b. Generate candidate rules from the tree ensemble, and
 c. Fit coefficients $a_j$ via regularized regression.

The BMA data items are categories into several types of variables and are evaluated to see which are most predictive of default risk. These variable types include:
 a. Raw BMA user-entered data (e.g., transactions, number of customers, . . . ),
 b. BMA usage behavior (e.g., browser used, number of logins, length of time the BMA is used, . . . ),
 c. Computed financial-health variables (e.g., net worth, EBITDA, inventory days turnover, . . . ), and
 d. Summary data (e.g., total capital dollar amount coming in to the company, total dollar amount going out of the company, number of distinct vendors paid in last 12 months, . . . ).

For example, the following BMA data items are selected from the above variable types as having the most predictive power (based on the training data set) and used as the input variables (301) and (311):
 a. Current ratio (current assets/current liabilities),
 b. Year-over-year sales growth,
 c. Number of online banking automatic downloads in a given month,
 d. Number of transactions with money leaving the company (e.g., bills paid) in a given month,
 e. Whether the company is a current BMA subscriber or not, and
 f. Whether the company is a customer for financial supplies (e.g., checks, accounting forms, etc.) or not.

In an example scenario, the output result of the model (303) includes a risk score (313) from 0 to 1 that may be interpreted as the probability that a company X may default on a loan within the next six months, the probability that the company X may be delinquent for one or more payments within the next six months, and/or the probability the company X may encounter some other derogatory financial event within the next six months. To properly train the model (303) for predicting such derogatory event of the company X occurring within next six months, the BMA data of each company in the training data set is restricted or filtered to one year time period preceding, by a six-month time gap, a historical loan default, historical payment delinquency, and/or other historical derogatory financial event of each company.

FIG. 3.2 shows an example of historical delinquent status (302) and input variables (301), (311) shown in FIG. 3.1 above. Specifically, the training data set (320) includes (i) BMA data of company A over one year period (321) and BMA data of company B over one year period (323), which are examples of input variables (301) of company A and company B among other companies contributing to the training data set (320), and (ii) derogatory event A occurred to company A (322) and derogatory event B occurred to company B (324), which are examples of the historical delinquent status (302). Note that the BMA data of company A over one year period (321) is selected from a BMA to be six months prior to the derogatory event A occurred to company A (322), as indicated by the six-month time gap A (330a) along the time line (340). Similarly, the BMA data of company B over one year period (323) is selected from the BMA to be six months prior to the derogatory event B occurred to company B (324), as indicated by the six-month time gap B (330b) along the time line (340). Specifically, BMA data of company A over the six-month time gap A (330a) and BMA data of company B over the six-month time gap B (330b) are excluded from being used to training the risk model (303). As described in reference to FIG. 3.1 above, once trained using the training data set (320), the risk model (303) is used to predict a probability of the derogatory event occurring to the company X within six months (i.e., six-month time gap (330c)) based on BMA data of company X over one year period (325) prior to time of analysis (350) shown on the time line (340).

Although the example shown in FIG. 3.2 is based on a one year time period of the BMA data and a six-month time gap, other length of BMA data time period or other length of time gap may also be used. For example, if a user decides to predict a probability of the derogatory event occurring to the company X within coming three months, then the six-month time gap A (330a), six-month time gap B (330b), and six-month time gap X (330x) are replaced by three-month time gaps in the example shown in FIG. 3.2. In other words, based on the user selected three month time gap, BMA data of company A, company B, etc. over one year time periods preceding the derogatory event A occurred to company A (322) and derogatory event B occurred to company B (324), respectively, by three months are used to train the risk model (303). In another example, the one year time period may be substituted by nine-month time period, tow year time period, etc.

Returning to the discussion of FIG. 3.1, the risk score (313) may be used in a number of ways:
 a. Kept in its raw, continuous format to be used in conjunction with other data to make a lending decision by a lender,
 b. By trading off the relative "cost" of incorrectly categorizing a business as risky when it is not, versus incorrectly categorizing a business as not risky when it is, a break point maybe determined where a company above that point is categorized as risky and below is categorized as not risky. Similarly, a number of breakpoints may be determined to create tiers for low, medium, and high risk companies.

The risk score (313) may be given to a lender directly or given to the particular company as a borrower and used at the borrower's discretion when applying for a loan from the lender. In addition, the risk score (313) may be dynamically updated in real time during the life of the loan as a leverage for the borrower to negotiate better terms with the lender if the borrower's business is doing well. Further, the risk score (313) may be dynamically updated in real time during the life of the loan for the lender to measure the ongoing risk of the loan with respect to the borrower's business reflected by the BMA data of the borrower.

Figure 4:
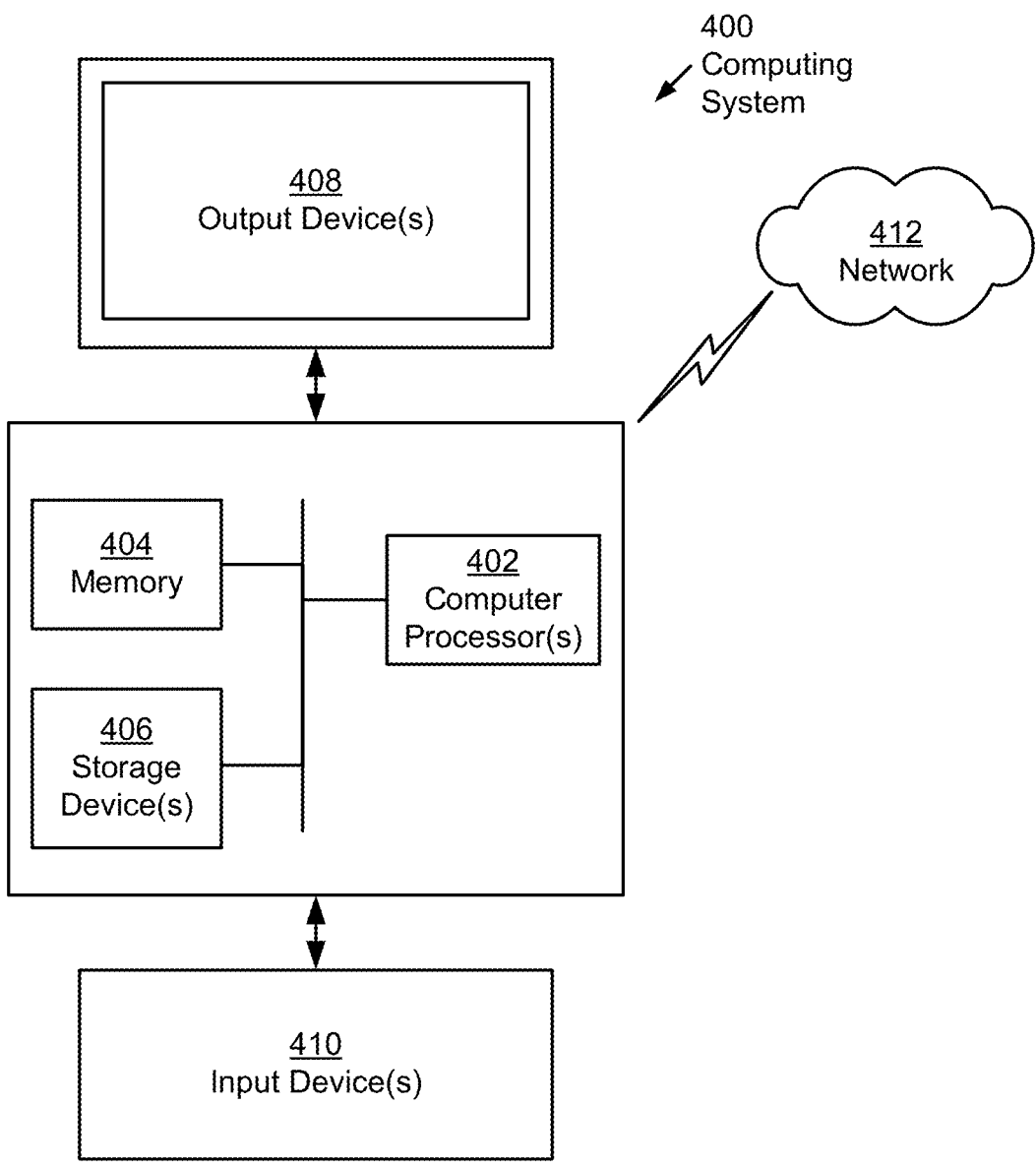
FIG. 4 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for modeling risk of a derogatory financial event, comprising:

receiving, via an Internet connection by a software as a service (SaaS) computer system from a plurality of business entities, a plurality of user inputs to access a business management application (BMA) executing on the SaaS computer system;

performing, by the BMA based on the plurality of user inputs, a plurality of tasks corresponding to business activities of the plurality of business entities;

extracting, from the plurality of user inputs, historic user entered data that represents the business activities of the plurality of business entities;

analyzing the plurality of tasks to generate historic usage statistics that represent how the plurality of business entities use the BMA;

generating, by a computer processor and based on the historic user entered data and the historic usage statistics, a training data set for modeling the risk of the derogatory financial event within a user specified time gap, wherein generating the training data set comprises:

identifying a portion of the plurality of business entities, wherein each business entity within the portion has the derogatory financial event occurred at a historic time point;

identifying a subset of the historic user entered data and the historic usage statistics that belongs to a first business entity within the portion, wherein the subset is within a first time period preceding the derogatory financial event of the first business entity;

excluding, from the subset, any data within the user specified time gap prior to the derogatory financial event of the first business entity;

assigning, based on the derogatory financial event of the first business entity, a derogatory status to the subset belonging to the first business entity; and including, in the training data set, the subset belonging to the first business entity and the derogatory status assigned to the subset;

training, by the computer processor and based on the training data set, a machine learning risk model of the derogatory financial event, wherein the machine learning risk model is dependent on the user specified time gap, wherein training the machine learning risk model of the derogatory financial event comprises:

building, according to a rule ensemble algorithm, a tree ensemble comprising a plurality of base learners, the plurality of base learners each corresponding to a plurality of decision trees on the training data set, generating a plurality of candidate rules by the tree ensemble, fitting coefficients, using the training data set, on the plurality of candidate rules via a regularized expression to obtain a trained machine learning risk model, the trained machine learning risk model configured to generate a probability of the derogatory financial event occurring to a corresponding business entity of the plurality of business entities, and iteratively adjusting the rule ensemble algorithm to obtain a further trained machine learning risk model, wherein iteratively adjusting is performed on a plurality of parameters within the machine learning risk model to increase a correlation between a modeled risk profile with a plurality of actual loan approval statistics and actual loan default statistics in the training data set, wherein the modeled risk profile is generated by the machine learning risk model;

obtaining, from the BMA, additional user entered data and additional usage statistics, wherein the additional user entered data are entered by a second business entity separate from the plurality of business entities and represents the business activities of the second business entity during a second time period, wherein the additional usage statistics represent how the second business entity uses the BMA during the second time period, wherein the second time period spans a length of time equal to a difference between the first time period and the user specified time gap;

analyzing, by the computer processor and using the trained machine learning risk model of the derogatory financial event, the additional user entered data and the additional usage statistics to determine a probability of the derogatory financial event occurring to the second business entity within the user specified time gap following the second time period; and providing, to a lender, the probability of the derogatory financial event occurring to the second business entity within the user specified time gap following the second time period, wherein the lender offers a loan program to the second business entity based at least on the user specified time gap following the second time period.

2. The method of claim 1,
wherein the historic user entered data and the historic usage statistics comprise at least one category selected from a group consisting of business statistics, business financial data, online banking historic usage statistics, accounting software trial details, marketing interaction data, general setup statistics, payroll setup statistics, customer support data, firmographics, product usage, subscription details, subscription billing details, payroll processing details, attrition details, customer statistics, pattern changes, transaction statistics, chargebacks statistics, and age statistics.

3. The method of claim 1,
wherein the derogatory financial event comprises at least one selected from a group consisting of a bankruptcy event, a debt collection event, a lien attach event, and a payment delinquency event.

4. The method of claim 1, wherein training the trained machine learning risk model of the derogatory financial event further comprises:

analyzing, using an adaptively-determined matching algorithm, the training data set to generate a plurality of risk profiles of the plurality of business entities, wherein each of the plurality of risk profiles comprises the probability of the derogatory financial event occurring to the corresponding business entity of the plurality of business entities; and adjusting the adaptively-determined matching algorithm to increase a correlation between the plurality of risk profiles and the derogatory financial event occurred to said each business entity within the portion, wherein the trained machine learning risk model of the derogatory financial event comprises the adaptively-determined matching algorithm.

5. The method of claim 4,
wherein the plurality of risk profiles comprises at least one selected from a group consisting of a number score, a percentage score, and a letter score.

6. A system for modeling risk of a derogatory financial event, comprising:
a computer processor;
a software as a service (SaaS) computer system configured to receive, via an Internet connection from a plurality of business entities, a plurality of user inputs to access a business management application (BMA) executing on the SaaS computer system, wherein the BMA is configured to perform, based on the plurality of user inputs, a plurality of tasks corresponding to business activities of the plurality of business entities;
memory storing instructions executable by the computer processor, wherein the instructions comprise:
a risk model generator configured to:
extract, from the plurality of user inputs, historic user entered data that represents the business activities of the plurality of business entities;
analyze the plurality of tasks to generate historic usage statistics that represent how the plurality of business entities use the BMA;
generate, based on the historic user entered data and the historic usage statistics, a training data set for modeling the risk of the derogatory financial event within a user specified time gap, wherein generating the training data set comprises:
identifying a portion of the plurality of business entities, wherein each business entity within the portion has the derogatory financial event occurred at a historic time point;
identifying a subset of the historic user entered data and the historic usage statistics that belongs to a first business entity within the portion, wherein the subset is within a first time period preceding the derogatory financial event of the first business entity;
excluding, from the subset, any data within the user specified time gap prior to the derogatory financial event of the first business entity;
assigning, based on the derogatory financial event of the first business entity, a derogatory status to the subset belonging to the first business entity; and
including, in the training data set, the subset belonging to the first business entity and the derogatory status assigned to the subset; and
train, based on the training data set, a machine learning risk model of the derogatory financial event, wherein the machine learning risk model represents a probability of the derogatory financial event occurring to the plurality of business entities, wherein the machine learning risk model is dependent on the user specified time gap, wherein the machine learning risk model of the derogatory financial event is trained by:
building, according to a rule ensemble algorithm, a tree ensemble comprising a plurality of base learners, the plurality of base learners each corresponding to a plurality of decision trees on the training data set,
generating a plurality of candidate rules by the tree ensemble, and
fitting coefficients, using the training data set, on the plurality of candidate rules via a regularized expression to obtain a trained machine learning risk model, the trained machine learning risk model configured to generate the probability of the derogatory financial event occurring to a corresponding business entity of the plurality of business entities, and
iteratively adjusting the rule ensemble algorithm to obtain a further trained machine learning risk model, wherein iteratively adjusting is performed on a plurality of parameters within the machine learning risk model to increase a correlation between a modeled risk profile with a plurality of actual loan approval statistics and actual loan default statistics in the training data set, wherein the modeled risk profile is generated by the machine learning risk model;
a risk profile generator configured to:
obtain, from the BMA, additional user entered data and additional usage statistics, wherein the additional user entered data are entered by a second business entity separate from the plurality of business entities and represents the business activities of the second business entity during a second time period, wherein the additional usage statistics represent how the second business entity uses the BMA during the second time period, wherein the second time period spans a length of time equal to a difference between the first time period and the user specified time gap;
analyze, using the trained machine learning risk model of the derogatory financial event, the additional user entered data and the additional usage statistics to determine the probability of the derogatory financial event occurring to the second business entity within the user specified time gap following the second time period; and
provide, to a lender, the probability of the derogatory financial event occurring to the second business entity within the user specified time gap following the second time period,
wherein the lender offers a loan program to the second business entity based at least on the user specified time gap following the second time period; and
a repository configured to store the training data set and the trained machine learning risk model of the derogatory financial event.

7. The system of claim 6,
wherein extracting the historic user entered data and generating the historic usage statistics comprises obtaining at least one category selected from a group consisting of business statistics, business financial data, online banking historic usage statistics, accounting software trial details, marketing interaction data, general setup statistics, payroll setup statistics, customer support data, firmographics, product usage, subscription details, subscription billing details, payroll processing details, attrition details, customer statistics, pattern changes, transaction statistics, chargebacks statistics, and age statistics.

8. The system of claim 6,
wherein determining the probability of the derogatory financial event occurring to the second business entity within the user specified time gap comprises determining the probability of at least one selected from a group consisting of a bankruptcy event, a debt collection event, a lien attach event, and a payment delinquency event.

9. The system of claim 6, wherein training the trained machine learning risk model of the derogatory financial event further comprises:
analyzing, using an adaptively-determined matching algorithm, the training data set to generate a plurality of risk profiles of the plurality of business entities, wherein each of the plurality of risk profiles comprises the probability of the derogatory financial event occurring to the corresponding business entity of the plurality of business entities; and
adjusting the adaptively-determined matching algorithm to increase a correlation between the plurality of risk profiles and the derogatory financial event occurred to said each business entity within the portion,
wherein the trained machine learning risk model of the derogatory financial event comprises the adaptively-determined matching algorithm.

10. The system of claim 9,
wherein the plurality of risk profiles comprises at least one selected from a group consisting of a number score, a percentage score, and a letter score.

11. A non-transitory computer readable medium storing instructions for modeling risk of a derogatory financial event, the instructions, when executed by a computer processor, comprising functionality for:
receiving, via an Internet connection by a software as a service (SaaS) computer system from a plurality of business entities, a plurality of user inputs to access a business management application (BMA) executing on the SaaS computer system;
performing, by the BMA based on the plurality of user inputs, a plurality of tasks corresponding to business activities of the plurality of business entities;
extracting, from the plurality of user inputs, historic user entered data that represents the business activities of the plurality of business entities;
analyzing the plurality of tasks to generate historic usage statistics that represent how the plurality of business entities use the BMA;
generating, based on the historic user entered data and the historic usage statistics, a training data set for modeling the risk of the derogatory financial event within a user specified time gap, wherein generating the training data set comprises:
identifying a portion of the plurality of business entities, wherein each business entity within the portion has the derogatory financial event occurred at a historic time point;
identifying a subset of the historic user entered data and the historic usage statistics that belongs to a first business entity within the portion, wherein the subset is within a first time period preceding the derogatory financial event of the first business entity;
excluding, from the subset, any data within the user specified time gap prior to the derogatory financial event of the first business entity;
assigning, based on the derogatory financial event of the first business entity, a derogatory status to the subset belonging to the first business entity; and
including, in the training data set, the subset belonging to the first business entity and the derogatory status assigned to the subset;

training, based on the training data set, a machine learning risk model of the derogatory financial event, wherein the machine learning risk model is dependent on the user specified time gap, wherein training the machine learning risk model of the derogatory financial event comprises:
building, according to a rule ensemble algorithm, a tree ensemble comprising a plurality of base learners, the plurality of base learners each corresponding to a plurality of decision trees on the training data set,
generating a plurality of candidate rules by the tree ensemble, and
fitting coefficients, using the training data set, on the plurality of candidate rules via a regularized expression to obtain a trained machine learning risk model, the trained machine learning risk model configured to generate a probability of the derogatory financial event occurring to a corresponding business entity of the plurality of business entities, and
iteratively adjusting the rule ensemble algorithm to obtain a further trained machine learning risk model, wherein iteratively adjusting is performed on a plurality of parameters within the machine learning risk model to increase a correlation between a modeled risk profile with a plurality of actual loan approval statistics and actual loan default statistics in the training data set, wherein the modeled risk profile is generated by the machine learning risk model;
obtaining, from the BMA, additional user entered data and additional usage statistics, wherein the additional user entered data are entered by a second business entity separate from the plurality of business entities and represents the business activities of the second business entity during a second time period, wherein the additional usage statistics represent how the second business entity uses the BMA during the second time period, wherein the second time period spans a length of time equal to a difference between the first time period and the user specified time gap;
analyzing, using the trained machine learning risk model of the derogatory financial event, the additional user entered data and the additional usage statistics to determine a probability of the derogatory financial event occurring to the second business entity within the user specified time gap following the second time period; and
providing, to a lender, the probability of the derogatory financial event occurring to the second business entity within the user specified time gap following the second time period,
wherein the lender offers a loan program to the second business entity based at least on the user specified time gap following the second time period.

12. The non-transitory computer readable medium of claim 11,
wherein the historic user entered data and the historic usage statistics comprise at least one category selected from a group consisting of business statistics, business financial data, online banking historic usage statistics, accounting software trial details, marketing interaction data, general setup statistics, payroll setup statistics, customer support data, firmographics, product usage, subscription details, subscription billing details, payroll processing details, attrition details, customer statistics, pattern changes, transaction statistics, chargebacks statistics, and age statistics.

13. The non-transitory computer readable medium of claim 11,
- wherein the derogatory financial event comprises at least one selected from a group consisting of a bankruptcy event, a debt collection event, a lien attach event, and a payment delinquency event.

14. The non-transitory computer readable medium of claim 11, wherein training the trained machine learning risk model of the derogatory financial event further comprises:
- analyzing, using an adaptively-determined matching algorithm, the training data set to generate a plurality of risk profiles of the plurality of business entities, wherein each of the plurality of risk profiles comprises the probability of the derogatory financial event occurring to the corresponding business entity of the plurality of business entities; and
- adjusting the adaptively-determined matching algorithm to increase a correlation between the plurality of risk profiles and the derogatory financial event occurred to said each business entity within the portion,
- wherein the trained machine learning risk model of the derogatory financial event comprises the adaptively-determined matching algorithm.

* * * * *